April 21, 1953 C. H. GRANT 2,635,837
AIRCRAFT AILERON CONTROL
Filed April 9, 1945 2 SHEETS—SHEET 1
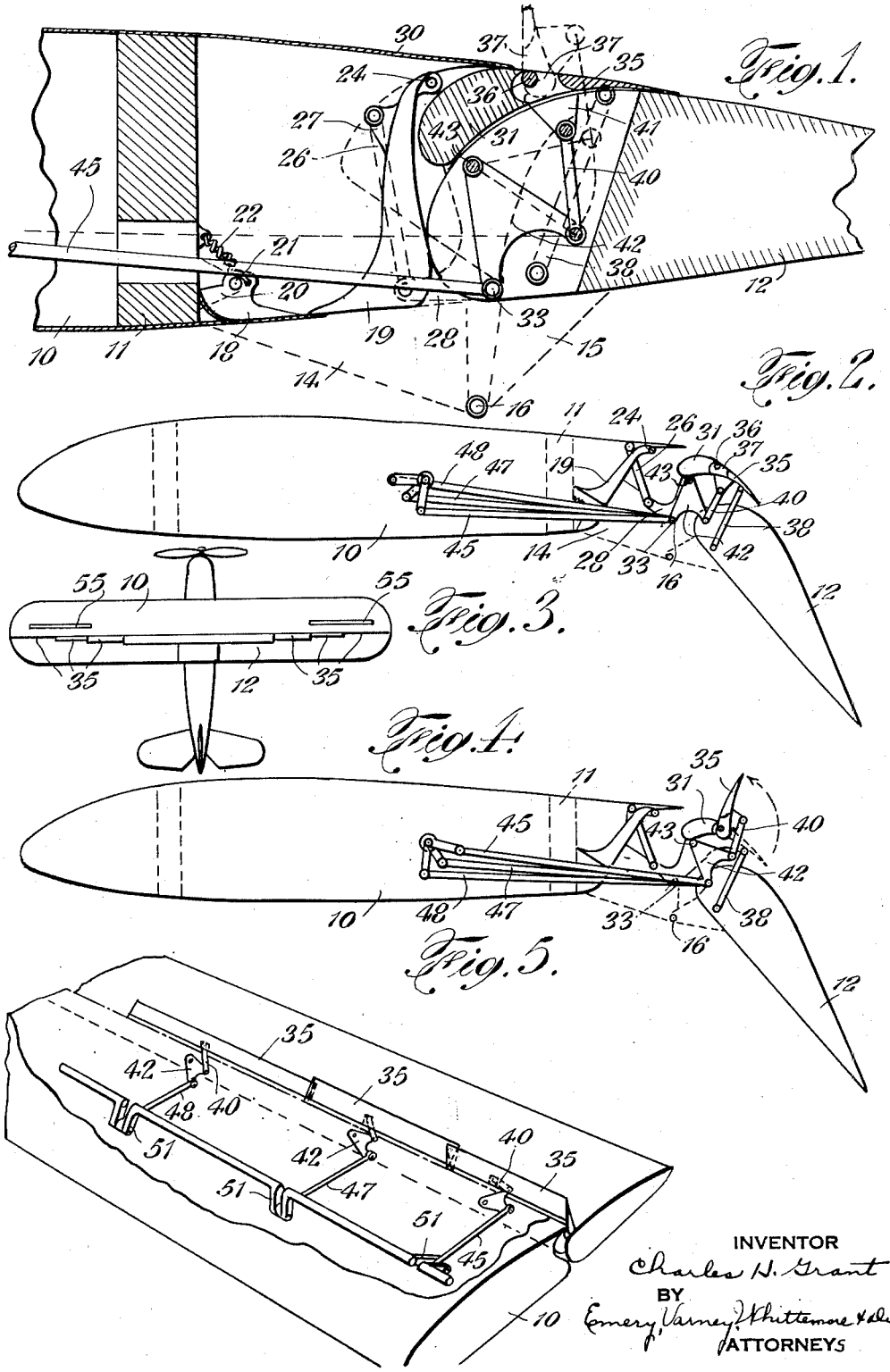
INVENTOR
Charles H. Grant
BY
Emery, Varney, Whittemore & Dix
ATTORNEYS

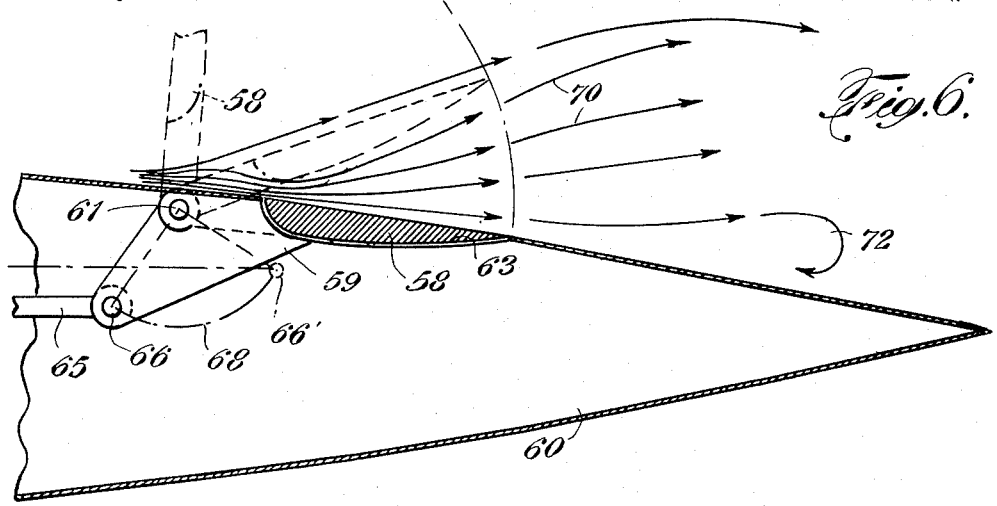
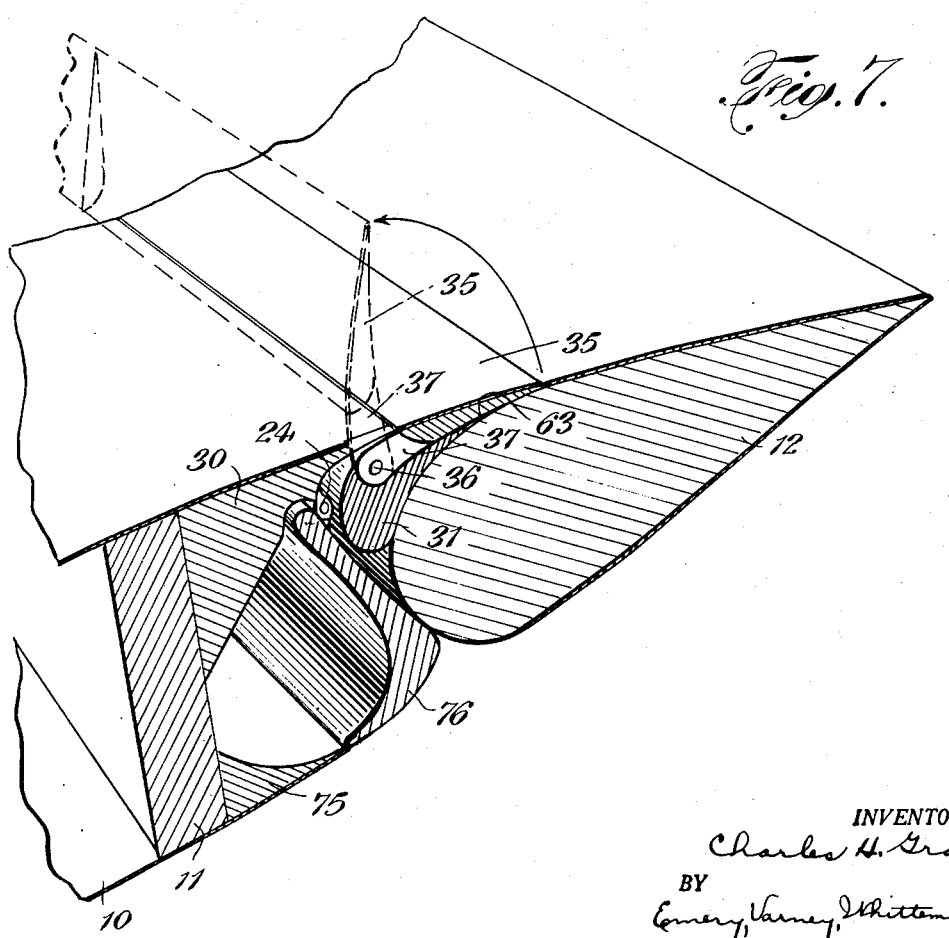

Patented Apr. 21, 1953

2,635,837

UNITED STATES PATENT OFFICE 2,635,837

AIRCRAFT AILERON CONTROL

Charles H. Grant, New Rochelle, N. Y.

Application April 9, 1945, Serial No. 587,301

12 Claims. (Cl. 244—90)

This invention relates to aircraft wings and especially to apparatus for obtaining aileron effect for controlling the roll of the aircraft.

The use of spoilers as ailerons is known, but as used heretofore, spoilers have not provided a sufficiently flexible control to be satisfactory for this purpose. One reason is that when a spoiler is raised the air flow has a tendency to flow across the partly raised spoiler without aileron effect, and as the spoiler is raised further it reaches a location at which the air flow breaks away from the wing suddenly giving an immediate aileron effect that may be more than desired. For this reason, spoilers have not given the graduation of control required for ailerons.

One object of this invention is to provide a new combination of spoilers with an aircraft wing by which flexible and graduated aileron control can be obtained. One feature of the invention relates to a construction that includes a series of spoilers across each wing of the aircraft, and individual spoilers of each series that are raised successively, preferably with automatic control for timing the sequence of operation. Even though the air breaks away from the wing, or back to the wing, suddenly, when individual spoilers reach critical positions as they are raised or lowered, this invention employs a plurality of separate spoilers in each series so that the aileron action varies in steps that are small enough to provide sufficient graduation to be practical.

Another feature of the invention relates to a spoiler construction in which the spoiler is hinged to the wing in such a way that a slot is provided for passage of air between the wing and the spoiler as the spoiler is raised. The air flow is divided so that some is deflected away from the wing while the boundary layer passes through the slot under the spoiler and continues its flow across the wing surface.

As the spoiler is raised higher, the greater angle of deflection of the air that passes over the spoiler causes the air stream that passes through the slot to burble at some distance behind the spoiler, and this distance becomes progressively less as the spoiler is raised further. When this slot feature of the invention is employed it is not essential that groups of spoilers be provided because the effect of the spoilers is progressive, but the use of groups of spoilers in combination with this slot feature provides a maximum of graduation of the aileron action.

In the preferred embodiment of the invention, the spoilers are combined with a wing slot and operate not only as spoilers, but are in effect also slot controllers and air stream deflectors, and by their control of the direction of air flow from the wing slot they affect the lift progressively so that any desired graduation of aileron action can be obtained. It may be said, therefore, that it is another object of the invention to provide a combined spoiler and slot air flow controller for obtaining aileron action.

The invention is of particular importance for wings that are equipped with flaps, either single or multi-segment, and by using the slot controller spoilers of this invention instead of ailerons, it is possible to have the flaps extend all the way to the tips of the wings, making possible a much higher total lift coefficient than has been possible with wings of the prior art in which the ailerons have prevented the use of flaps extending as far out as the wing tips.

Another feature of the invention relates to a construction in which a slot controller spoiler is a part of a slot controller structure that provides two slots which are generally parallel and extend approximately spanwise ahead of the flap, and that are located in such positions that the air stream from the first slot can be deflected upward to force air away from the top surface of the airfoil. This feature permits the use of smaller spoilers and obtains a highly efficient and effective control of the lift imparted by the flap.

Another object of the invention is to provide an airfoil that has a flap with a novel apparatus for obtaining aileron control, which apparatus is of maximum effectiveness when the flap is depressed, and the effectiveness of which varies inversely as the speed. This is just the opposite to conventional ailerons in which the aileron effect is greater at high speed even though aileron action is more essential at slow speeds, as when taking off or landing.

Other objects, features and advantages of the invention will appear or be pointed out as the description proceeds.

In the drawing, forming a part hereof, in which like reference characters indicate corresponding parts in all the views, Figure 1 is a fragmentary, diagrammatic view illustrating the aircraft wing construction of this invention with the flap in raised position.

Figure 2 is a diagrammatic illustration, on a reduced scale, with the flap depressed, and the slot-controller spoiler in a position in which it exerts no aileron effect.

Figure 3 is a top plan view, on a reduced scale, showing an airplane equipped with the spoiler ailerons of this invention.

Figure 4 is a view similar to Figure 2 but showing the slot-controller spoiler in position to obtain maximum aileron effect.

Figure 5 is a fragmentary perspective view of an aircraft wing equipped with a plurality of spoilers and with operating mechanism for raising the spoilers successively in accordance with a predetermined sequence.

Figure 6 is a diagrammatic view illustrating a modified form of the invention.

Figure 7 is a diagrammatic perspective view, partly in section, showing a modification of the structure illustrated in Figures 1, 2, 4 and 5.

Figure 1 shows an airplane wing that has a forward rigid or fixed portion 10 with a rear spar 11 and a flap 12. There are brackets 14 connected to the rear spar at spaced locations, and the flap 12 has hinge plates 15 connected to the brackets 14 by pivots 16. This construction is merely representative of a hinged connection between a flap and the forward section of a wing, and other constructions can be used for connecting the flap directly to the forward wing section with a slot, or mechanism for creating a slot, between the forward wing section and the leading edge of the flap.

The lower end of the space between the wing section 10 and flap 12 is closed by a gate 18 and a lower slot-controller element 19. The gate 18 preferably extends for the full spanwise extent of the slot and is supported from the rear spar 11 by lugs 20 and pivot connections 21. A coil spring 22 is connected at its lower end to the gate 18 and anchored at its upper end to the rear spar 11. This spring 22 urges the gate 18 to rotate counterclockwise about the axis of the pivot connections 21, but the rearward end of the gate 18 contacts with the bottom face of the lower slot-controller element 19 and prevents the gate 18 from moving except in response to movement of the lower controller element 19.

The lower slot controller element 19 extends for the full spanwise extent of the slot and is supported from the forward wing section 10 by pivots 24. The slot controller element 19 is moved about the pivots 24 by a link 26 connected at one end with a lug 27 of the controller element 19 and connected at its other end with a bracket 28 which moves in response to angular movement of an upper slot-controller element 31 and the flap 12.

The upper end of the space between the forward wing section 10 and the flap 12 is closed partly by an extension 30 of the forward wing section 10 and partly by the upper slot-controller element 31. This upper slot-controller element 31 is supported by brackets 28 at spaced locations along the spanwise extent of the wing. These brackets 28 are connected with the fixed bracket 14 along a pivot axis 33.

In the case of the brackets 28 as well as the other supports for the spanwise extending parts, such as the gate 18, slot-controller elements 19 and 31, and the flap 12, the number of supporting brackets or hinge plates depends upon the span of the wing and the strength of the parts. Connections may be located further apart if a highly rigid construction is used but lighter connections are suitable if they are spaced more closely. Appropriate clearance is provided in the leading edge of the flap 12 and through the lower controller element 19 to accommodate the various links and brackets.

The upper controller element 31 is an airfoil section, and its rearward portion is made up of a row of separate sections or spoilers 35 that are hinged to the forward portion of the controller element 31 by pivot connections 36. These rearward sections 35 can be raised by rotating them counterclockwise about their pivot connections 36, and when raised they function as spoilers and break the air flow across the top surface of the flap 12.

The spoilers 35 have hinges comprising end plates 37 (Figures 1 and 7) for connecting them with the pivots 36, and these end plates 37 extend somewhat beyond the forward ends of the spoilers 35 so that as each spoiler is elevated there is a slot between the lower forward end of the spoiler and the top surface of the controller element 31 or airfoil section immediately below the spoiler.

The position which the upper slot controller element 31 assumes when the flap 12 is depressed is illustrated in Figure 2. When the flap 12 moves about its hinged connection 16, the upper slot controller element 31 is rocked about the pivot axis 33 by a link 38 that is connected at its upper end with the bracket 28 and at its lower end with the flap 12. Movement of the bracket 28 in a clockwise direction around the pivot axis 33 pushes the link 26 forward and upward to rock the lower controller element 19 about its pivot 24 and to open the slot between the forward section 10 and the flap 12. In the construction illustrated, the slot has a single entrance but is divided at its upper end by the upper controller element 31 so that there are two slots, one to the rear of the other, through the upper surface of the airfoil.

The upper slot-controller element 31 is so shaped, and so positioned, with respect to the forward wing extension 30 and the contour of the leading edge of the flap 12, that the two slots have cross sections which decrease toward their upper ends for causing the air streams from these slots to increase in velocity and discharge rearwardly and in a direction substantially tangent to the airfoil surfaces behind them. This prevents the air flow from breaking away from the top surface of the airfoil, even with the flap depressed at a large angle. The outlet provided by the rearward slot is substantially lower than the outlet end of the forward slot so that the air stream across the top surface of the airfoil changes in direction at two regions spaced along the length of the chord and obtains results similar to those obtained from multi-segment flaps.

There are a number of spoilers 35 along the slot, as shown in Figures 3 and 5. Each of these spoilers is operated by a link 40 (Figures 2 and 4) connected at its upper end with a lug 41 on the bottom of the spoiler, and connected at its lower end with a bell-crank 42 which rocks about a pivot 43 on the bracket 28. The bell-crank 42 is operated by a reach rod 45 connected to the lower end of the bell-crank 42. This connection is on the pivot axis 33 when the spoiler 35 is lowered as shown in Figures 1 and 2, and because of the fact that this operating connection for the bell-crank 42 is on the same pivot axis 33 about which the bracket 28 rocks when the flap is depressed, angular movement of the flap does not cause any relative movement of the spoiler 35 with respect to the forward portion of the slot-controller element 31 when the spoiler is in its lowered position. The reach rod 45 can be operated at any time, regardless of the angular position of the flap 12 and bracket 28, to move the spoiler 35 into an elevated position, such as shown in Figure 4.

The reach rod 45 operates the spoiler 35 which is located nearest to the wing tip. The next spoiler 35 nearer to the center of the aircraft is operated by a reach rod 47, and the spoiler 35 still nearer to the center line of the aircraft is operated by a third reach rod 48. These reach rods 45, 47 and 48 are representative of means for raising respective spoilers at different times and in accordance with any predetermined sequence of operation.

In accordance with one feature of the invention, the respective spoilers are raised by common operating means, one embodiment of which is illustrated in Figure 5.

In this figure, a common shaft 50, supported from the forward wing structure 10 by suitable bearings, has cranks 51 for operating the reach rods 45, 47, and 48 of the respective spoilers 35. The cranks 51 are set at different angles about the axis of the shaft 50 so that the different spoilers 35 are raised successively, and in a desired sequence.

The control apparatus shown in Figure 5 raises first the spoiler 35 nearest the wing tip, and raises other spoilers 35 progressively inward in succession. The advantage of making the spoiler nearest the wing tip move into effective position ahead of the other spoilers is that any spoiler at an intermediate position on a wing affects air flow over the surface behind it for a spanwise area considerably greater than the length of the spoiler. By raising the spoiler nearest the wing tip first and then successively raising the next adjacent spoiler toward the longitudinal center line of the plane, each spoiler is made to control the air flow across a smaller area of the wing.

The links to the spoilers are of such length that all of the spoilers are in their lowered positions when the respective operating cranks are in the positions shown in Figure 2. As each of these cranks is moved through an angle of 90 degrees, it will move its link horizontally for a distance equal to the radius of the crank circle. At the end of 90 degrees of movement of the cranks all of the spoilers will have been moved substantially the same distance and into their raised positions.

Because of the fact that the downwardly extending crank is in a position where its angular movement produces a maximum horizontal displacement of its connected link 45, and the fact that the horizontally extending crank is in a position where angular movement of the crank produces substantially no horizontal displacement of its associated link 48, the spoiler operated by the link 45 will move upward ahead of the spoiler operated by the link 48. It will be evident, of course, that toward the latter part of their movement the spoiler operated by the link 45 will move very slowly, whereas the spoiler operated by the link 48 will move progressively faster so that if the spoilers are raised to their maximum height they will reach that position at substantially the same time.

The spoilers 35 may be of equal size, or of different spanwise extent. In the construction illustrated in Figure 5, the spoilers 35 are of progressively greater spanwise extent toward the longitudinal center line of the aircraft. This tends to make the different spoilers of substantially equal effect for obtaining aileron action since the spoilers nearer the wing tips have greater aileron effect per unit of spanwise extent because of their greater distance from the longitudinal axis about which the aircraft rolls. Figure 3 shows spoilers 55 located ahead of the slot that separates the flap from the forward portion of the wing. With such spoilers used in combination with one or more spoilers further aft, variation in aileron effect can be obtained by operating the spoilers successively, the rearward spoiler being operated first since it destroys the lift of less area of the wing than does the forward spoiler. This sequence of operation is obtained by connection of spoilers 55 with link mechanism from control shaft 50 (Figure 5).

The variation in cross section of a wing slot affects the air velocity and the lift obtained as a result of the air flow through the slot. By changing this variation, defusing the flow and reducing the air velocity, the lift can be reduced, and this effect is obtained by the initial movement of the spoilers 35 upward from the dotted to the full line position shown in Figure 4. The spoilers 35 function both as slot controllers and spoilers. The initial upward movement of the spoilers 35, when the flap is depressed, is effective only as a slot controller.

As the spoilers 35 rise further they decrease the lift resulting from the air stream through the rearward slot and they also serve as deflectors for changing the direction of the air stream that comes through the forward slot. Such deflection causes the air stream from the forward slot to move upward and break the continuity of air flow from the upper surface of wing section 10 back across the flap 12. Air flow from the rearward slot is defused and broken as it passes over the flap 12 at decreasing velocity. This destroys much of the lifting effectiveness of the flap 12.

With any spoiler 35 raised to its maximum displacement, as shown in Figure 4, the air flow disturbance set up by the deflected air from the forward slot is increased over that due to a spoiler of equal size but with no forward slot. This also causes a break in the air flow from the rearward slot and destroys the lift of the flap 12, though the flap is still effective to increase the drag of the wing for stopping the plane when landing.

By making the spoilers 35 a part of the slot controller, graduation in the aileron effect can be obtained by changing the air flow through the slots on one or the other side of the longitudinal axis of the plane, and it is possible to get a graduated aileron effect with only one spoiler 35 that extends for all or a substantial part of the spanwise extent of the slot. It will be understood that a spoiler 35, such as shown with two slots in Figures 2 and 4, can be used with only a single slot, but if full advantage is to be taken of the spoiler as a slot flow controller, it must be located with respect to the slot as the spoilers 35 are with respect to the rearward slot in Figures 2 and 4.

The use of multiple spoilers operated in succession can be used to obtain aileron effect even though these spoilers are not incorporated in the slot controller and even though the wing with which they are used has no flap. Such a modification of the invention does not obtain such minute graduation of lift for the respective wings as is obtained by using the spoilers also as slot flow controllers, and by using a plurality of spoilers.

Successive spoiler operation such as shown in Figure 5, when used on a wing that has no flap, moves all of the spoilers at the same time, though different angular distances, but those spoilers that are at a small displacement are not yet effective to break the air flow and reduce the lift of the wing area behind them. For the purpose of this invention cams or eccentrics are, of course, mechanical equivalents of the cranks shown in Figure 5.

Figure 6 shows a modified construction in which a spoiler aileron is used with an airfoil section having no flap. An aileron spoiler 58 has end plates 59 connected to an airfoil section 60 by a pivot connection 61. The spoiler 58 fits into a recess 63 in the top surface of the airfoil 60 so that the top of the spoiler is flush with the top surface of the airfoil.

The end plate 59 extends downward into the interior of the airfoil and serves as a bell crank for moving the spoiler 58. A reach rod 65 is connected to the lower end of the hinge plate 59 by a pin 66. Rearward movement of the reach rod 65 pushes the pin 66 back along the path indicated by the dotted line 68 to an extreme position indicated by the reference character 66'. When the pin 66 is in the position 66' the spoiler 58 is raised to the uppermost position shown in dotted lines in Figure 6.

In order to obtain a burble of the boundary layer, over the surface of the airfoil, it is necessary to limit the thickness of the layer of air, passing under the spoiler, with respect to the size of the spoiler so that the mass of air deflected upward by the spoiler is sufficient to affect the layer of air from under the spoiler all the way down to the boundary layer of air in contact with the airfoil. In the illustrated embodiment of the invention, the slot between the raised spoiler and the airfoil has a dimensional component, normal to the top surface of the airfoil, equal to approximately two-sevenths of the corresponding dimensional component of the spoiler above the level of the top of the slot.

The arrows 70 indicate the direction of air flow around the spoiler 58 when it's in the intermediate dotted line position shown in Figure 6. In this position air moves through the slot between the spoiler 58 and airfoil section 60 and also moves across the top of the partially elevated spoiler. As the air stream emerges from the slot under the spoiler there is a decrease in velocity because of the increase in cross section of the air stream, and this decrease in velocity, coupled with the effect of the upwardly deflected stream from the top surface of the spoiler causes the air stream to eventually burble as indicated by the reference arrow 72. This decreases the lift of the rearward portion of the airfoil.

As the spoiler 58 is raised higher, the slot between the spoiler and airfoil becomes wider and the air stream diverges more rapidly after passing through the slot. This combines with the sharper angle of deflection of the air which passes over the top of the spoiler to cause a burble of the boundary layer at a shorter distance behind the spoiler thereby decreasing the lift of the larger portion of the wing. In this way the spoiler can be raised progressively to destroy more and more of the air foil lift on one side of the center axis of the plane for the purpose of rolling the plane about its center axis.

Without the slot between the spoiler and airfoil, the spoiler exerts substantially no effect upon the lift during its initial upward movement, and then destroys the lift of the airfoil section behind the spoiler suddenly, making it impossible to obtain a graduated aileron control. This operation of the air flow under and over the spoiler 58 in Figure 6 is illustrative of the operation with respect to the spoilers shown in Figures 1 to 5, though when the flap is depressed there is some modification of the air stream also by the slots in front of and behind the controller element to which the spoiler is connected in Figures 1 to 5.

From the above description it will be evident that a reduction in the height of the slot under the spoiler merely causes the region of burble of the boundary layer to occur at a lower spoiler angle and to move forward more quickly toward the spoiler as the spoiler is raised. Increase in the height of the slot under the spoiler will destroy the feature of reduced lift if the layer of air passing under the spoiler becomes too thick for the air over the spoiler to cause a burble all the way down to the airfoil surface.

Figure 7 is a diagrammatic showing of a construction similar to that of Figures 1 to 5 but with a fixed wing section 75 connected to the rear spar 11 in place of the gate 18 of Figure 1. This fixed wing section has an inner surface curved about the axis of the pivot 24 to allow for swinging movement of the lower controller element 76 which corresponds to the controller element 19 of Figure 1. The bottom face of the controller element 76 is curved about the axis of the pivots 24 as a center.

Figure 7 shows the spoiler 35 in full lines in its lowered position, and in dotted lines in its elevated position. It will be apparent from this figure that the spoiler 35 can be raised, when the flap 12 is in raised position, to exert an aileron effect even though the slots through the wing are closed when the flap 12 is up. The slot which opens between the spoiler 35 and the top surface of the wing as soon as the spoiler 35 moves out of its recess in the top surface of the wing, permits continued air flow across the top surface of the wing so that the decrease in lift caused by the spoiler is progressive, as explained in connection with Figure 6. As long as the spoiler 35 is down in the recess 63, it does not deflect the air stream across the wing sufficiently to cause it to break or burble.

The preferred embodiment of this invention has been illustrated and described. Various changes and modifications can be made. The invention can be used equally well with slot controllers in which the same element controls the opening at both the top and bottom of the slot. Some features of the invention can be used without others and in modified constructions without departing from the invention as defined in the claims.

I claim as my invention:

1. An airplane wing including a fixed forward portion, a flap, a slot controller between the forward portion and the flap, a spoiler on the slot controller, control means on the fixed wing portion and connected with the spoiler for operating the spoiler independently of the slot controller.

2. Combined in an aircraft wing, a rigid forward portion, a rearward flap portion hinged to the said forward portion in spaced chordwise relation, a slot controller element pivotally connected to the rigid forward portion and located between the said rigid forward portion and the flap, connecting means between the slot controller element and the flap, said connecting means causing the slot controller to rotate when the flap is depressed and provide specific widths of slot openings between the controller element and other wing structure for any given degree of flap deflection, said slot controller separating at least the upper portion of the said slot into two slots leading to the upper surface of the wing, and which serves to close the slots when the flap is raised, the said controller element embodying a forward section and a rearward section pivoted to the forward section at a point that is nearer to the upper surface of said airfoil than it is to the leading edge of said rearward section, the said rearward section constituting the trailing edge of the controller element and which is divided into separate panels disposed parallel to a spanwise axis and which are movable about their pivotal attachment to regulate the width of the rearward slot, means for rotating said rearward section panels into positions that deflect the airflow from the forward slot away from the top surface of the wing, said means including pivoted control elements for each rearward section panel section, each of which move through different phase angles when they are rotated, separate connecting means between each control element and a corresponding rearward section panel, said means transmitting different sequence of angular motion from the said control elements to the various said panels.

3. Combined in an aircraft wing, a rigid forward portion, a rearward flap portion hinged to the said forward portion in spaced chordwise relation, a controller element pivotally connected to the flap and located between the said rigid forward portion and the flap, connecting means between the slot controller element and the rigid forward portion, the flap connection causing the slot controller to rotate when the flap is depressed and provide specific widths of slot openings between the controller element and other wing structure for any given degree of flap deflection, said slot controller separating at least the upper portion of the said slot into two slots leading to the upper surface of the wing, and which serves to close the slots when the flap is raised, the said controller element embodying a forward section and a rearward section pivoted to the forward section at a point that is nearer to the upper surface of said airfoil than it is to the leading edge of said rearward section, the said rearward section constituting the trailing edge of the controller element and which is divided into separate panels disposed parallel to a spanwise axis and which are movable about their pivotal attachment to regulate the width of the rearward slot, means for rotating said rearward section panels into positions that deflect the airflow from the forward slot away from the top surface of the wing, said means including pivoted control elements for each rearward section panel section, each of which move through different phase angles when they are rotated, separate connecting means between each control element and a corresponding rearward section panel, said means transmitting different sequence of angular motion from the said control elements to the various said panels.

4. Combined in an aircraft wing, a forward rigid portion, a rearward flap portion pivotally connected to the said forward portion in chordwise spaced relation, controller elements located between the forward rigid section and the flap which include an upper rearward section of airfoil contour and a lower forward gate section, the said upper rearward section being located adjacent to the upper surface of the flap leading edge so that at least a part of the upper surface of the said section serves as part of the upper surface of the wing, and which section is pivoted to the forward rigid portion of the wing at a point located below the chord line of the upper rearward section of the controller, the lower forward gate section being located adjacent to and forward of the leading edge of the flap and being pivoted to the forward rigid portion of the wing at a point located above the most forward point of the flap leading edge and above the lower extremity of the said gate section, connections between the flap, the upper rearward section of the controller and the gate section which transmit motion from the flap to the controller sections while the flap is being lowered or raised to move the gate section forward away from the flap leading edge and the upper rearward section moving rearward thereby dividing the upper outlet portion of the slot immediately forward of the flap into two slots, one between the flap and the upper rearward section of the controller and one between the said controller section and the forward rigid portion of the wing, each slot diminishing in width toward its outlet and both slots leading from the single throated lower portion of the slot immediately forward of the flap leading edge, to the upper surface of the wing, thereby providing two openings at this said surface, the said lower portion of the slot having only one inlet opening at the under surface of the wing, a spoiler surface constituting the rearward portion of the upper rearward section of the controller and which is pivoted to the forward portion of the said rearward section of the controller, the axis of the pivot being located forward of the foremost edge of the spoiler surface at a distance greater than the distance from said axis to the upper surface of the wing when the spoiler is in retracted position, and so that as pace exists between the foremost edge of the spoiler surface and upper surface of the wing that is immediately beneath it when the spoiler is in a raised position, said space being of sufficient width to allow at least part of the boundary layer of air over the upper wing surface to pass through this space beneath the foremost edge of the spoiler surface when the said spoiler surface is raised at an effective angle, means for raising and lowering said spoiler surface at any operational angle of the flap in accordance with operational requirements of the aircraft.

5. Combined in an aircraft wing, a forward rigid portion, a rearward flap portion pivotally connected to the said forward portion in chordwise spaced relation, controller elements located between the forward rigid section and the flap which include an upper rearward section of airfoil contour and a lower forward gate section, the said upper rearward section being located adjacent to the upper surface of the flap leading edge so that at least a part of the upper surface of the said section serves as part of the upper surface of the wing, and which section is pivoted to the flap portion at a point located below the chord line of the upper rearward section of the controller, the lower forward gate section being located adjacent to and forward of the leading edge of the flap and being pivoted to the forward rigid portion of the wing at a point located above the most forward point of the flap leading edge and above the lower extremity of the said gate section, connections between the forward rigid portion of the wing, the upper rearward section of the controller and the gate section which transmit motion from the flap to the controller sections while the flap is being lowered or raised to move the gate section forward away from the flap leading edge and the upper rearward section moving rearward thereby dividing the upper outlet portion of the slot immediately forward of the flap into two slots, one between the flap and the upper rearward section of the controller and one between the said controller section and the forward rigid portion of the wing, each slot diminishing in width toward its outlet and both slots leading from the single throated lower portion of the slot immediately forward of the flap leading edge, to the upper surface of the wing, thereby providing two openings at this said surface, the said lower portion of the slot having only one inlet opening at the under surface of the wing, a spoiler surface constituting the rearward portion of the upper rearward section of the controller and which is pivoted to the forward portion of the said rearward section of the controller, the axis of the pivot being located forward of the foremost edge of the spoiler surface at a distance greater than the distance from said axis to the upper surface of the wing when the spoiler is in retracted position, and so that a space exists between the foremost edge of the spoiler surface and upper surface of the wing that is immediately beneath it when the spoiler is in a raised position, said space being of sufficient width to allow at least part of the boundary layer of air over the upper wing surface to pass through this space beneath the foremost edge of the spoiler surface when the said spoiler surface is raised at an effective angle, means for raising and lowering said spoiler surface at any operational angle of the flap in accordance with operational requirements of the aircraft.

6. In an aircraft comprising wings, each of which includes a rigid forward portion and a flap forming with the forward portion a wing of airfoil section, said flap being movable between a raised and a depressed position, said flap being hinged in spaced relation to the trailing edge of the forward portion of the wing to swing about the hinge from a raised position in which the flap substantially coincides with the airfoil profile to a lowered, high lift position whereby the spaced relation is increased, a slot controller that closes the slot provided by the spaced relation of the flap and the trailing edge of the forward portion of the wing when the flap is in its raised position, said slot controller being movable into position to separate at least the upper portion of the slot into two slots through the upper surface of the wing when the flap is in its lowered position, a row of spoilers constituting the trailing edge of the slot controller, hinges connecting said spoilers to the slot controller and on which the spoilers are movable to regulate the width of the rearward slot, means for raising said spoilers of each wing selectively to provide lateral control about the longitudinal axis of the aircraft, said spoilers being movable into position to deflect the air flow from the forward slot away from the top surface of the wing, said means including a common shaft with displacement elements at spaced regions along its length, said displacement elements being in different phase angle relation, and separate motion transmitting means between each of the angular displacement means, and each of the spoilers of the slot controller for operating said spoilers successively in accordance with a predetermined sequence.

7. An aircraft wing comprising a forward portion, a flap hinged to the forward portion and forming with the forward portion a wing of airfoil section, said flap being movable between a raised and a depressed position, and said flap being in spaced relation to the trailing edge of the forward portion of the wing to swing about the hinge from a raised position in which it substantially coincides with the airfoil profile to a lowered, high lift position whereby the spaced relation is increased, a slot controller in the space between the forward portion and the flap, and a deflector element comprising a part of the slot controller, a hinge connecting the deflector element to the slot controller and about which the deflector element is movable between raised and lowered positions, said hinge being located in such position on the wing that the deflector element regulates the area of the slot opening when in lowered position, and deflects the air flow away from the top surface of the flap when the deflector element is in raised position, and control means that move the deflector element about its hinge when the flap is in either raised or lowered position.

8. An airplane wing of airfoil section comprising a forward part and a rearward flap forming a portion of the airfoil section, said flap being movable between a raised and a depressed position, and said flap being hinged in spaced relation to the trailing edge of the forward portion of the wing to swing about the hinge from a raised position in which it substantially coincides with the airfoil profile to a lowered, high lift position whereby the spaced relation in increased, slot control means in the space between the forward wing portion and the flap, said slot control means being shaped to provide a rearward slot in front of the leading edge of the flap and a forward slot in front of at least a portion of the slot control means when the flap is in its lowered position, both of said slots extending substantially spanwise and being substantially parallel to one another, a spoiler comprising a portion of the slot control means, a hinge by which the spoiler is connected with the other part of the slot control means, said hinge being located in position to put the spoiler in a location to regulate the air flow through the rearward slot when the spoiler is shifted about the hinge into a downward position, said spoiler being of sufficient length to deflect the air flow from the forward slot upward and away from the top surface of the wing when the spoiler is swung about the hinge into a raised position.

9. An airplane wing as described in claim 1 and in which the slot controller is supported on the wing structure by a pivot on which the slot controller swings when the flap is raised and depressed and in which the connection between the spoiler and the control means on the fixed wing portion comprises motion transmitting connections with a pivot having its axis in line with the axis of the pivot that supports the slot controller when the spoiler is in its retracted position.

10. A combination with a wing of airfoil section and a plurality of spoilers on the same surface of the airfoil section and having forward edges extending across successive spanwise portions of the wing, hinge means connecting each of the spoilers with the wing, said hinge means having their axes extending substantially parallel to the forward edges of the respective spoilers that they connect with the wing, and said hinge means being connected with the wing in such positions that the axes of the hinge means are below the top surface of the airfoil section for a distance less than the distance from the forward edges of the spoilers to the axes of said hinge means, and said hinge comprising elements connected to the spoilers at spanwise spaced regions leaving space between the airfoil and the forward edges of the spoilers unobstructed by the hinge along substantial spanwise portions of the forward edges of the spoilers when the spoilers are in raised position, and common control means that move the respective spoilers into raised positions successively, said common control means comprising a separate operator connected to each spoiler and an actuator connected to all of the operators to move them through substantially equal distances in a predetermined succession.

11. The combination comprising a wing having a rigid forward portion and a flap forming with the forward portion a wing of airfoil section, said flap being movable between raised and depressed positions, and said flap being hinged in spaced relation to the trailing edge of the forward portion of the wing to swing about the hinge from a raised position in which it substantially coincides with the airfoil profile to a lowered, high lift position whereby the spaced relation is increased, a slot controller forward of the flap and contained within the airfoil section, means connecting the slot controller with both the flap and the rigid forward portion of the wing, said means including links that move the slot controller in coordinate motion with the flap to regulate a slot that is created between the flap and the slot controller when the flap is in its lowered position, a deflector element constituting the rearward portion of the slot controller, a pivot connection between the deflector element and the forward portion of the slot controller, control apparatus that moves the deflector about said pivot connection to regulate the width of said slot opening for all positions of the flap, the cordwise length of the deflector element being greater than the distance from the top surface of the wing to the axis of said pivot connection so that when the deflector element is moved into a raised position it extends above the upper surface of the wing and retards and deflects the air flow passing over the upper surface, and control means that operate the deflector element independently of the flap.

12. The combination with a wing of airfoil section of a device for gradually and progressively decreasing the velocity of air across the surface of a rearward portion of the wing with resulting progressive decrease in the lift of said rearward portion of the wing, said device comprising a spoiler having a forward edge extending spanwise of the wing immediately ahead of said rearward portion of the wing, a hinge connecting the spoiler to the wing, said hinge having an axis extending substantially parallel to the forward edge of the spoiler, and said hinge being located with its axis at a distance below the top surface of the airfoil section, which distance is less than the space between the hinge axis and the forward edge of the spoiler, the hinge comprising elements connected to the spoiler at spanwise spaced regions so that when the spoiler is swung about the hinge into a raised position there is a slot between the spoiler and the top surface of the airfoil section for the passage of the boundary layer of air that travels across the top surface of the airfoil, the dimensional component of said slot normal to the top surface of the airfoil being substantially less than one-half of the corresponding dimension of the spoiler above the level of the top of said slot so that the elements and spoiler are constructed and arranged to limit air flow under the spoiler to a layer that diverges, after passing through the slot, more rapidly as the spoiler is raised higher to cause a burble of the boundary layer of air at progressively shorter distances behind the spoiler thereby decreasing the lift of a progressively larger portion of the airfoil.

CHARLES H. GRANT.

References Cited in the file of this patent

UNITED STATES PATENTS

| Number | Name | Date |
|---|---|---|
| 1,880,019 | Harper | Sept. 27, 1932 |
| 2,034,218 | Weich et al. | Mar. 17, 1936 |
| 2,041,688 | Barnhart | May 26, 1936 |
| 2,070,006 | Eaton | Feb. 9, 1937 |
| 2,243,885 | Schweisch | June 3, 1941 |
| 2,261,363 | Griswold | Nov. 4, 1941 |
| 2,271,763 | Fowler | Feb. 3, 1942 |
| 2,289,704 | Grant | July 14, 1942 |
| 2,322,745 | Rogallo | June 29, 1943 |
| 2,329,177 | Baker | Sept. 14, 1943 |
| 2,334,975 | Williams | Nov. 23, 1943 |
| 2,379,274 | Boyd | June 26, 1945 |
| 2,383,102 | Zap | Aug. 21, 1945 |
| 2,480,040 | Mitchell | Aug. 23, 1949 |

FOREIGN PATENTS

| Number | Country | Date |
|---|---|---|
| 822,987 | France | Oct. 4, 1937 |
| 517,895 | Great Britain | Feb. 12, 1940 |